(12) United States Patent
Welchko (10) Patent No.: US 7,193,378 B1
(45) Date of Patent: Mar. 20, 2007

(54) WYE SWITCH INVERTER FOR ELECTRIC AND HYBRID VEHICLES

(75) Inventor: Brian Welchko, Torrance, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/375,456

(22) Filed: Mar. 14, 2006

(51) Int. Cl.
*H02P 6/00* (2006.01)

(52) U.S. Cl. ........................ 318/254; 318/722; 318/724

(58) Field of Classification Search ................ 318/138, 318/254, 439, 459, 720–724, 799–802
See application file for complete search history.

(56) References Cited

U.S. PATENT DOCUMENTS

| | | | | |
|---|---|---|---|---|
| 4,847,747 A | * | 7/1989 | Abbondanti | ................ 363/138 |
| 5,138,242 A | * | 8/1992 | Kim et al. | .................. 318/501 |
| 5,661,383 A | * | 8/1997 | Schlager et al. | ............ 318/439 |
| 5,677,605 A | * | 10/1997 | Cambier et al. | ............ 318/254 |
| 6,236,179 B1 | * | 5/2001 | Lawler et al. | .............. 318/439 |

* cited by examiner

*Primary Examiner*—Bentsu Ro
(74) *Attorney, Agent, or Firm*—Christopher DeVries (57) ABSTRACT

A circuit for controlling a multi-phase machine having a stator with stator windings includes a controller, primary commutation switch pairs, a neutral terminal, and commutation control switches. Each switch pair includes first and second primary commutation switches connected at a node. Each commutation control switch is coupled to a winding so that a stator winding circuit is formed between the neural terminal and a respective one of the nodes. Each commutation control switch includes a first diode connected in parallel with a series switch circuit. Each series switch circuit includes a second diode and a series connected switch element. The controller is coupled to the switch elements and the primary commutation switch pairs to control an on time and an off time of the primary commutation switches relative to a point where a supply voltage is equal to the back emf.

12 Claims, 6 Drawing Sheets

WYE SWITCH INVERTER FOR ELECTRIC AND HYBRID VEHICLES

BACKGROUND OF THE INVENTION

1. Field of the Invention

The present invention relates to motor controls for permanent magnet AC synchronous motors and brushless DC motors.

2. Description of Related Art

Figure 1:
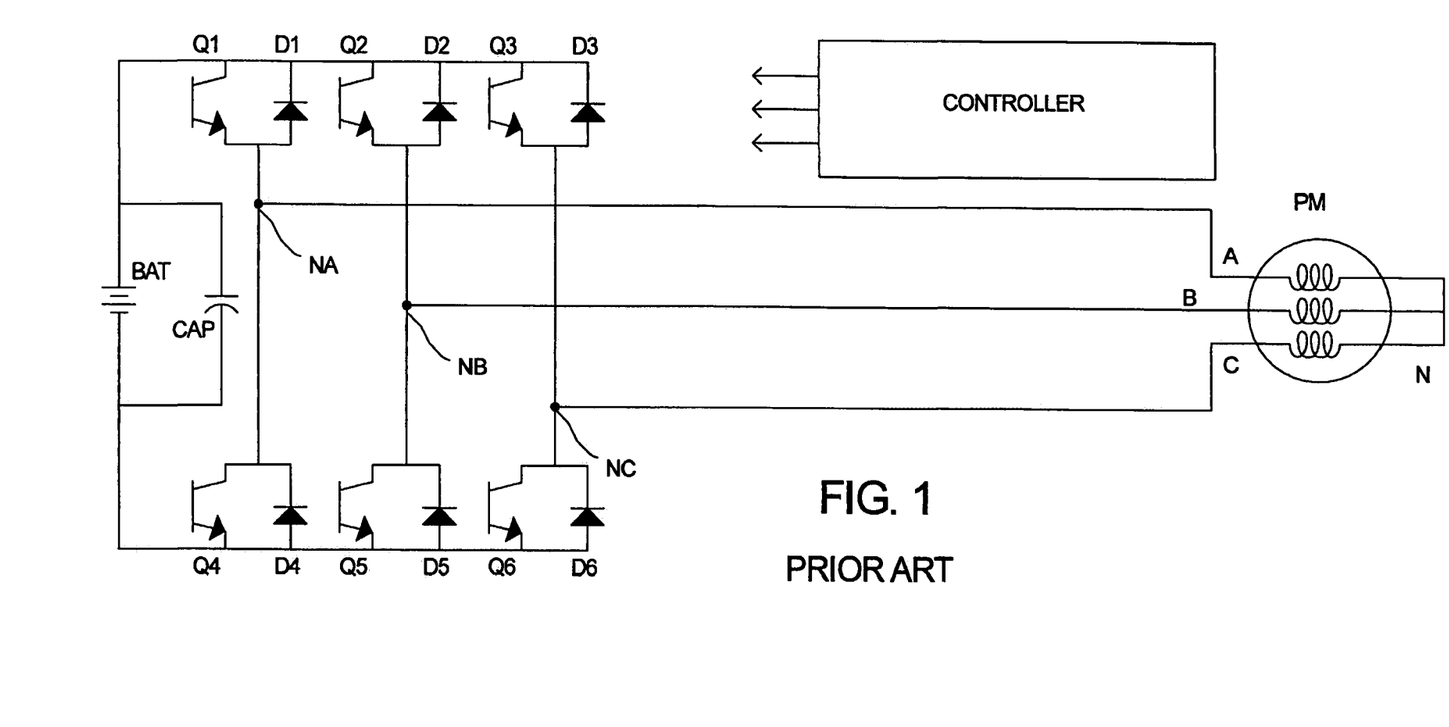
FIG. 1 is a schematic diagram of a known type of inverter for electric and hybrid vehicles.

In FIG. 1, a known three phase motor drive system for motor PM is depicted with a power inverter and a power source that includes a battery BAT together with capacitor CAP. The power inverter includes primary commutation switches Q1–Q6 together with bypass diodes D1–D6 configured as shown. Permanent magnet motor PM is a three phase motor driven by three stator windings A, B and C. To energize windings A and B with a current in one direction, switches Q1 and Q5 are turned on, and all other switches are turned off. To energize windings A and B with a current in the other direction, switches Q2 and Q4 are turned on, and all other switches are turned off. To energize windings A and C with a current in one direction, switches Q1 and Q6 are turned on, and all other switches are turned off. To energize windings A and C with a current in the other direction, switches Q3 and Q4 are turned on, and all other switches are turned off. To energize windings B and C with a current in one direction, switches Q2 and Q6 are turned on, and all other switches are turned off. To energize windings B and C with a current in the other direction, switches Q3 and Q5 are turned on, and all other switches are turned off.

As discussed in U.S. Pat. No. 6,236,179 to Lawler, et al., incorporated herein by reference, AC synchronous motors and brushless DC motors are controlled through commutation of solid state switching devices connected to their stator windings. These motors can be of the permanent magnet (PM) type in which permanent magnets are used on the rotor instead of rotor windings. As the speed of the rotor increases, the voltage developed in the stator (referred to as the "back emf") increases. This, in turn, requires that higher and higher terminal voltages be applied to produce the desired torques. Base speed is that speed which is at the top of the constant torque range and at the beginning of the constant horsepower range. In many uses, it is desirable to limit terminal voltage at a certain speed and yet maintain a constant horsepower over a certain speed range above base speed. The ratio of the highest speed that can be attained to the base speed at which the limit of terminal voltage is reached is termed the constant power speed ratio. Attaining a desired constant power speed ratio is made more difficult when the motor inductance is in the microhenry range.

PM motors with interior mounted magnets (IPMs) have been shown to have constant power speed ratios of 7.5:1. However, these types of PM motors are not commercially available.

In traction devices such as electric vehicles, the torque-speed specifications call for a constant torque up to some base speed, and then constant horsepower operation up to a higher speed. PM electric motors with rare earth surface-mounted permanent magnets are viable candidates for such applications due to their power density and efficiency. These motors are electrically commutated and are driven by inverters.

Camber et al., U.S. Pat. No. 5,677,605, issued Oct. 14, 1997, discloses a drive system for a brushless DC motor which uses PWM inverter, and phase timing advancement to control operation in the constant power range above base speed. This patent discloses a three-phase brushless DC motor driven by a six-step PWM drive. The commutation switches include IGBTs (insulated gate bipolar transistors) and MOSFETs (MOS field effect transistors) for the primary switching devices in parallel with bypass diodes.

As speed increases and commutation takes place at a rapid rate, this arrangement may allow for continuous conduction of the phase current and conduction by the bypass diodes at undesirable times, leading to the loss of power and efficiency. The inverter and the motor may heat up, thereby requiring additional cooling measures.

Figure 2:
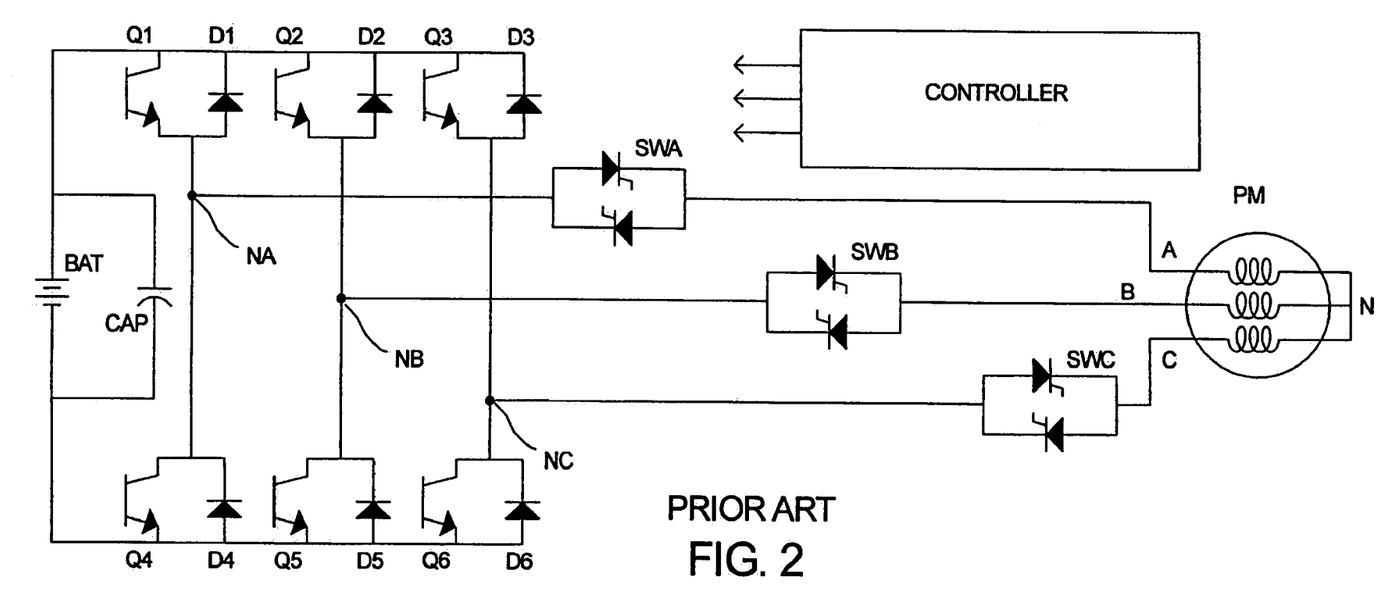
FIG. 2 is a schematic diagram of another known type of inverter for electric and hybrid vehicles.

U.S. Pat. No. 6,236,179 issued May 22, 2001 to Lawler et al., the subject matter of which is incorporated herein. FIG. 2 depicts a modification, taught by Lawler et al., of the known system depicted in FIG. 1. A circuit for controlling a three-phase machine PM, that has a stator with three stator windings, includes a controller (as depicted in FIG. 1), three primary commutation switch pairs, a neutral terminal N and three stator winding circuits. The first switch pair includes a first primary commutation switch (Q1, D1) and a second primary commutation switch (Q4, D4) connected at node NA. The second switch pair includes a first primary commutation switch (Q2, D2) and a second primary commutation switch (Q5, D5) connected at node NB. The third switch pair includes a first primary commutation switch (Q3, D3) and a second primary commutation switch (Q6, D6) connected at node NC. The first stator winding circuit includes commutation control switch SWA connected between node NA and one end of winding A of the three-phase motor PM. The other end of winding A is connected to the neutral terminal N. The second stator winding circuit includes commutation control switch SWB connected between node NB and one end of winding B of the three-phase motor PM. The other end of winding B is connected to the neutral terminal N. The third stator winding circuit includes commutation control switch SWC connected between node NC and one end of winding C of the three-phase motor PM. The other end of winding C is connected to the neutral terminal N.

Each of the commutation control switches SWA, SWB and SWC consist of two anti-parallel silicon controlled rectifiers. The silicon control rectifiers (known as SCRs) are non-conducting in reverse bias situation, and are also non-conducting, even when forward biased, unless a trigger signal is received while the SCR is forward biased. Once triggered while forward biased, the SCR becomes conductive. After an SCR is conducting, it remains conducting until the voltage across the SCR drops to zero or the SCR becomes reverse biased. In this way, the controller can provide a trigger pulse to the SCR and thereby initiate the on cycle any time the SCR is forward biased; however, the SCR can be returned to the non-conducting state only at the end of a cycle when the voltage across the SCR reverses. The controller is coupled to the SCRs to control a phase advance conduction angle of the primary commutation switches relative to a point where a supply voltage is equal to the back emf.

The Lawler et al. circuit is applied to three-phase motors with low motor inductance. This circuit is intended for motors that operate at speeds well above the base speed where the base speed is the highest speed at which a specified torque is obtained. For example, the motor may be specified to require XXX torque up to speeds of YYY rpm. As motor speed increases, the stator winding develop a back emf. When the back emf magnitude from a motor winding becomes larger than the supply voltage, some means must be found to further drive the motor since current still needs to be injected into the stator windings of the motor PM in order for the motor to continue to develop power. Lawler et al. drives the motor beyond base speed by injecting current into the stator winding at a motor rotational angle advanced ahead of the angle at the time when the back emf magnitude from a motor winding becomes larger than the supply voltage. Lowler et al. provides this current at an advance angle by using the controller to trigger one of the SCRs in the appropriate commutation control switch, SWA, SWB or SWC at the advance angle. In Lawler, et al, the advance angle is provided in a range from zero to sixty degrees. This advance angle controls the developed power as explained in Lawler, et al. When the voltage across an SCR become zero or negative, the SCR is turned off. At some speeds only slightly greater than base speed and at some advance angles, the Lawler et al. circuit may not result in the outgoing phase current reaching zero before the time that the phase is to be switched back into service. This results in a "commutation failure" which is not catastrophic but which does reduce the average output power and increase the RMS current.

SUMMARY OF THE INVENTION

A circuit for controlling a multi-phase machine having a stator with stator windings includes a controller, primary commutation switch pairs, a neutral terminal, and commutation control switches. Each switch pair includes first and second primary commutation switches connected at a node. Each commutation control switch is coupled to a winding so that a stator winding circuit is formed between the neural terminal and a respective one of the nodes. Each commutation control switch includes a first diode connected in parallel with a series switch circuit. Each series switch circuit includes a second diode and a series connected switch element. The controller is coupled to the switch elements and the primary commutation switch pairs to control an on time and an off time of the primary commutation switches relative to a point where a supply voltage is equal to the back emf.

A motor vehicle engine includes a multi-phase machine having a stator with plural stator windings, a controller, primary commutation switch pairs, a neutral terminal, and commutation control switches coupled to the multi-phase machine. Each switch pair includes first and second primary commutation switches connected at a node. Each commutation control switch is coupled to a winding so that a stator winding circuit is formed between the neural terminal and a respective one of the nodes. Each commutation control switch includes a first diode connected in parallel with a series switch circuit. Each series switch circuit includes a second diode and a series connected switch element. The controller is coupled to the switch elements and the primary commutation switch pairs to control an on time and an off time of the primary commutation switches relative to a point where a supply voltage is equal to the back emf.

An electric motor system includes an electric power source, a multi-phase machine having a stator with plural stator windings, a controller, primary commutation switch pairs coupled to the electric power source, a neutral terminal, and commutation control switches coupled to the multi-phase machine. Each switch pair includes first and second primary commutation switches connected at a node. Each commutation control switch is coupled to a winding so that a stator winding circuit is formed between the neural terminal and a respective one of the nodes. Each commutation control switch includes a first diode connected in parallel with a series switch circuit. Each series switch circuit includes a second diode and a series connected switch element. The controller is coupled to the switch elements and the primary commutation switch pairs to control an on time and an off time of the primary commutation switches relative to a point where a supply voltage is equal to the back emf.

BRIEF DESCRIPTION OF DRAWINGS

The invention will be described in detail in the following description of preferred embodiments with reference to the following figures.

DETAILED DESCRIPTION OF PREFERRED EMBODIMENTS

Figure 3:
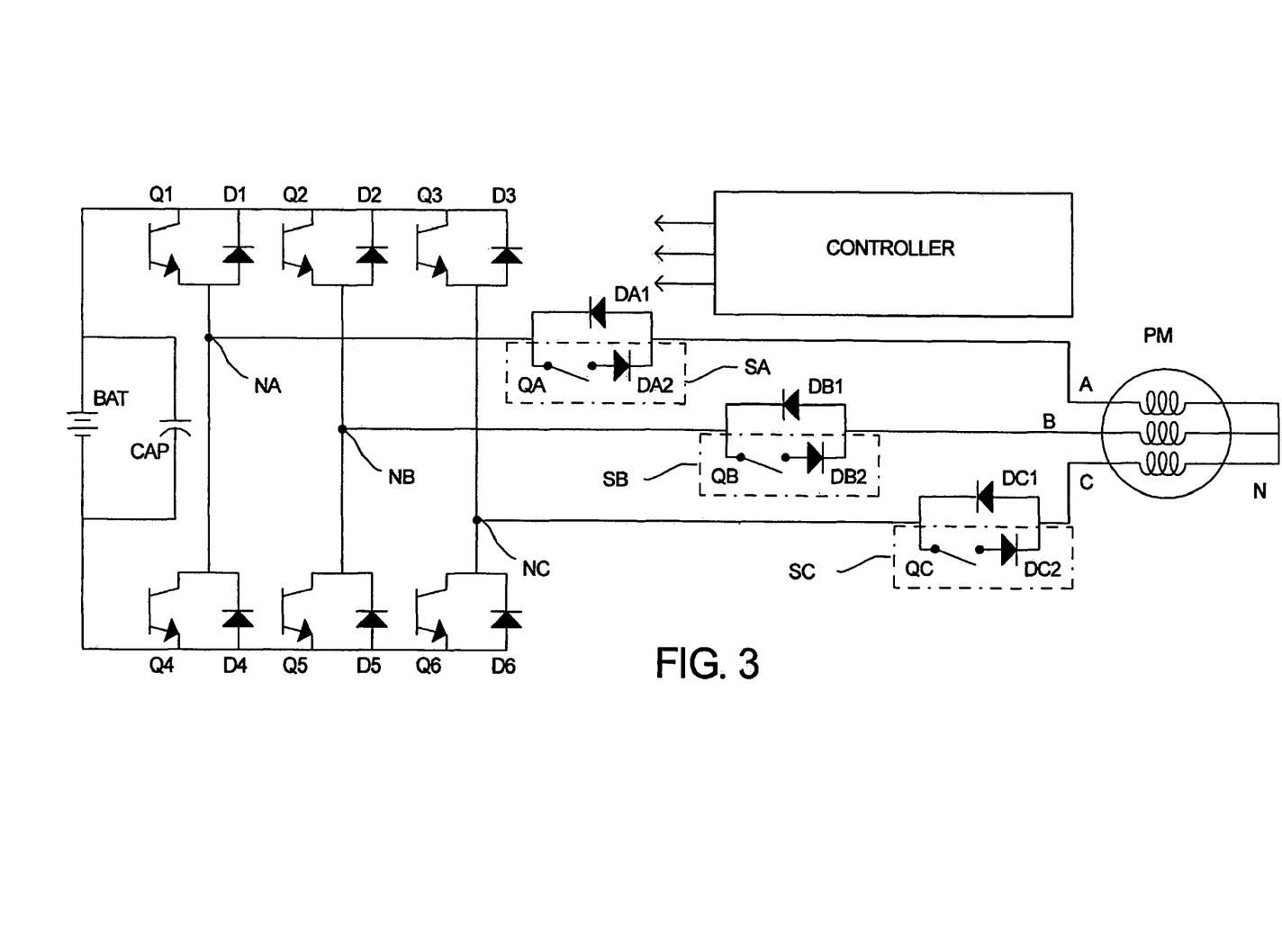
FIG. 3 is a schematic diagram of an inverter according to an embodiment of the invention.

In FIG. 3, a circuit for controlling a multi-phase machine that has a stator with plural stator windings is depicted. The circuit includes a controller (not shown), a neutral terminal N, plural primary commutation switch pairs and plural commutation control switches. Each of the plural primary commutation switch pairs includes first and second primary commutation switches connected at a respective node. The first switch pair includes a first primary commutation switch (Q1, D1) and a second primary commutation switch (Q4, D4) connected at node NA. The second switch pair includes a first primary commutation switch (Q2, D2) and a second primary commutation switch (Q5, D5) connected at node NB. The third switch pair includes a first primary commutation switch (Q3, D3) and a second primary commutation switch (Q6, D6) connected at node NC.

Each of the plural commutation control switches is coupled to a corresponding winding of the stator windings so that a corresponding stator winding circuit is formed between the neural terminal and a respective one of the nodes. Each of the plural stator winding circuits is coupled between the neural terminal N and a respective one of the nodes NA, NB or NC. Two alternative configuration are available to a designer for each stator winding circuit.

In the first alternative configuration, the first stator winding circuit includes commutation control switch SA connected between node NA and one end of winding A of the three-phase motor PM, and the other end of winding A is connected to the neutral terminal N. The second stator winding circuit includes commutation control switch SB connected between node NB and one end of winding B of the three-phase motor PM, and the other end of winding B is connected to the neutral terminal N. The third stator winding circuit includes commutation control switch SC connected between node NC and one end of winding C of the three-phase motor PM, and the other end of winding C is connected to the neutral terminal N.

In the second alternative configuration, the first stator winding circuit includes commutation control switch SA connected between the neutral terminal N and one end of winding A of the three-phase motor PM, and the other end of winding A is connected to node NA. The second stator winding circuit includes commutation control switch SB connected between the neutral terminal N and one end of winding B of the three-phase motor PM, and the other end of winding B is connected to node NB. The third stator winding circuit includes commutation control switch SC connected between the neutral terminal N and one end of winding C of the three-phase motor PM, and the other end of winding C is connected to node NC. A designer may even choose to connect one or more of the commutation control switches between the motor PM and the neutral terminal N, and choose to connect other commutation control switches between the motor PM and respective ones of the nodes.

In FIG. 3, each of the commutation control switches SA, SB and SC includes a first diode connected in parallel with a series switch circuit, and each series switch circuit includes a second diode and a switch element, the switch element being connected in series with the second diode. For example, commutation control switch SA includes a first diode DA1 connected in parallel with a series switch circuit that includes a second diode DA2 connected in series with a switch element QA. Similarly, commutation control switch SB includes a first diode DB1 connected in parallel with a series switch circuit that includes a second diode DB2 connected in series with a switch element QB, and commutation control switch SC includes a first diode DC1 connected in parallel with a series switch circuit that includes a second diode DC2 connected in series with a switch element QC. Each of the switch elements QA, QB and QC are preferably either a PNP IGBT, an NPN IGBT or a MOSFET. An NPN IGBT is depicted in FIG. 3. Each of the switch diode pairs, QA and DA2, QB and DB2, QC and DC2, may also be realized in the invention with an IGBT switch capable of both forward and reverse blocking voltage. This type of switch is typically called a reverse blocking IGBT, RBIGBT.

It should be noted that U.S. Pat. No. 6,236,179 to Lawler, et al. uses two anti-parallel silicon controlled rectifiers (SCRs), or what Lawler, et al. calls thyristors, for each commutation control switch SA, SB and SC. The anti-parallel SCRs are operable to begin current flow when an SCR is both forward biased and then triggered, and the SCRs are operable to automatically cease current flow only when the voltage across the SCR diminishes to zero or becomes back biased.

Referring again to FIG. 3, when each of the three switch elements QA, QB and QC are closed, or turned on, current may flow in either direction through the commutation control switches SA, SB and SC. As a result, with the commutation control switches closed, any control method may be used to control the primary commutation switches Q1–Q6 and thereby control the motor PM.

On the other hand, when the three switch elements QA, QB and QC are open, or turned off, current cannot flow through the motor windings even though diodes DA1, DB1 and DC1 are still in the circuit. This is because the wye connected motor PM has no source for the current when diodes DA1, DB1 and DC1 are connected as depicted in FIG. 3. Furthermore, when only two of the three switch elements QA, QB and QC are open, or turned off, current still cannot flow through the motor windings even though the third switch element may still be closed or turned on. Kirchoff's law requires that the sum of the currents through the windings of the wye connected motor PM be zero, otherwise, charge would build up on, for be drained from, the neutral connection of the wye connected motor PM.

The controller is coupled to the switch element in each of the commutation control switches and to the primary commutation switch pairs to control an on time and an off time of the primary commutation switches relative to a point where a supply voltage is equal to the back emf. In this way, current to the motor can be stopped at any time, rather than waiting for the cycle to end where the voltage across an SCR is diminished to zero.

During high-speed operation of motor PM, the magnet based back-emf of the motor can rise to be larger than the possible output voltage of the primary commutation switches of the inverter by an excess voltage. In known circuits for controlling motor PM, the excess voltage causes power to flow out of the motor into and through the inverter to battery BAT. This is a generation mode causes two effects. First, the motor to operate as a generator and the battery is recharged. Second, the torque generated by the motor is negative, and this acts as a break. In situations when zero torque is desired during high-speed operation of the motor, a field weakening current must be imposed on the motor by the primary commutation switches of the inverter in order to reduce the back-emf to a point where the back-emf exactly equals the output voltage of the primary commutation switches of the inverter so that the motor torque is zero. To achieve zero torque, the field weakening current must be imposed on the motor even though the motor produces no torque. The field weakening current that must flow causes a power drain on the battery, and this loss of power during high-speed operation where no torque is produced is called "spin loss."

In known circuits, spin losses are incurred during no-load high-speed operation of motor PM. However, in the circuit of FIG. 3, the commutation control switches SA, SB and SC can be turned off (i.e., open circuit) at any time to totally eliminate spin losses by eliminating the conduction path that would otherwise carry the field weakening current. As a result, currents do not have to be imposed by the inverter to controllably produce zero output torque. By switching off all of the switch elements QA, QB and QC of the commutation control switches SA, SB and SC, current through the motor, and therefore spin losses, can be eliminated.

There are other consequences of no-load high-speed operation of motor PM where the back-emf of the motor can rise to be larger than the possible output voltage of the primary commutation switches of the inverter by an excess voltage. Without commutation control switches of the circuit being turned off, the voltage on nodes of the inverter will pass through the normally back-biased diodes D1–D6 in the primary commutation switches. During no-load high-speed operation of motor PM, current can flow from one or more windings of motor PM, through one or more of diodes D1–D3 to charge battery BAT, and returns through one or more of diodes D4–D6 and into one or more of the windings of motor PM. This is referred to as an uncontrolled generator mode. The charging current in the uncontrolled generator mode can cause a breaking torque to be experienced by the motor and can damage the inverter, capacitor CAP or event the battery BAT. If the battery cannot charge at the rate imposed by the uncontrolled generator mode, the capacitor CAP will charge up to the voltage of the back-emf and then the current ceases. In order to avoid damage to the inverter, the battery BAT, the capacitor CAP, and the primary commutation switches Q1–Q6, including didoes D1–D6, must be rated to withstand the maximum expected back-emf voltage, and any related current surge, that could be produced by motor PM.

However, in the circuit of FIG. 3, the commutation control switches SA, SB and SC can be turned off (i.e., open circuit) at any time to totally eliminate the uncontrolled generator mode by eliminating the conduction path that would otherwise carry the field back-emf voltage to the inverter. By switching off all of the switch elements QA, QB and QC of the commutation control switches SA, SB and SC, the back-emf voltage that might be generated in an uncontrolled generator mode is not imposed across the battery BAT, the capacitor CAP, and the primary commutation switches Q1–Q6, including diodes D1–D6, and these components need not be rated to withstand the back-emf voltage that might be generated in an uncontrolled generator mode. As a result, the inverter damage is avoided during no-load high-speed operation of motor PM. The diodes DA1, DA2, DB1, DB2, DC1 and DC2 and switch elements QA, QB and QC of commutation control switches SA, SB and SC may need to be rated to withstand the back-emf voltage that might be generated in an uncontrolled generator mode; however, since the increased ratings are required on only commutation control switches SA, SB and SC, this represents a significant cost savings over the known art.

In contrast, the Lawler et al. circuit can only turn off commutation control switches SA, SB and SC when the cycle diminishes the voltage across the SCR to zero.

Figure 4:
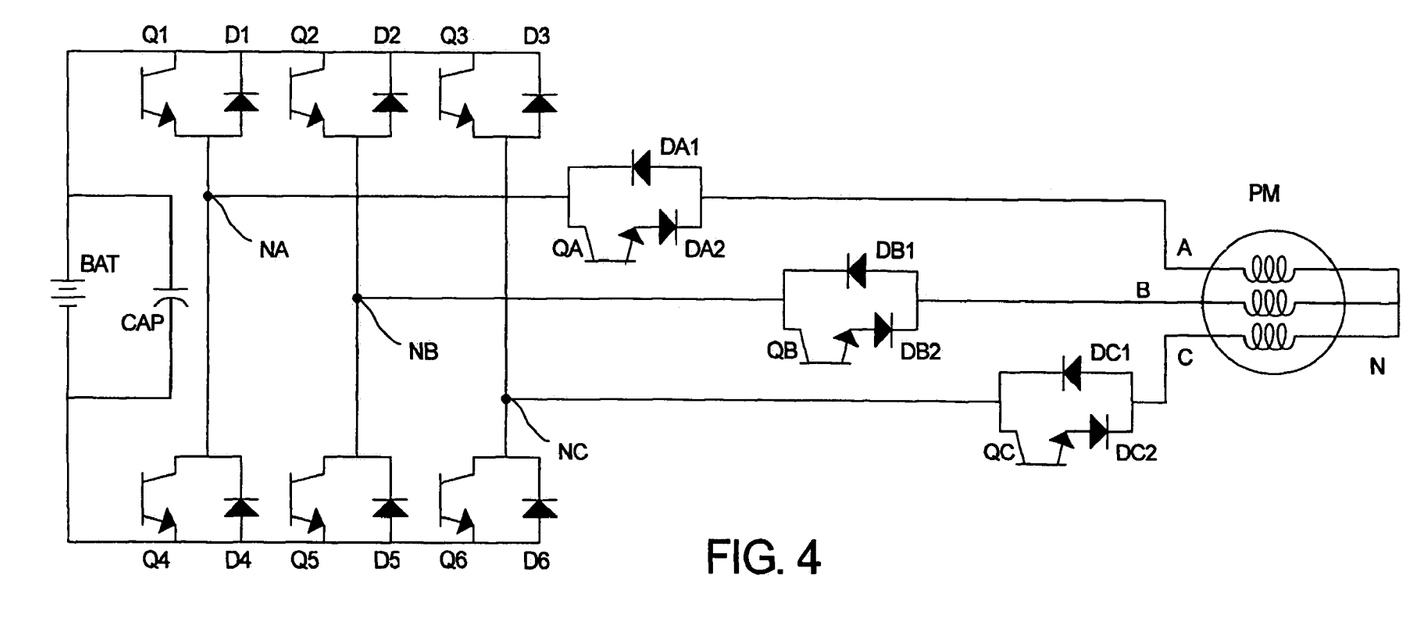
FIG. 4 is a schematic diagram of a variant of the inverter of FIG. 3.

A variant of the circuit depicted in FIG. 3 is depicted in FIG. 4 where the switch element, QA, QB or QC, in each commutation control switch, SA, SB or SC, includes an NPN IGBT. FIG. 4 depicts diode DA1 of commutation control switch SWA with its anode connected to motor PM and its cathode connected to a node of a primary commutation switch pair. The cathode of diode DA2 is connected to the anode of diode DA1, and the switch element QA is connected to a node of a primary commutation switch pair. Commutation control switches SB or SC are similarly configured.

Alternatively, commutation control switches SA, SB and SC could be end to end reversed, and the switches would function fine. With commutation control switch SA end to end reversed, the cathode of diode DA1 would be connected to the motor PM and the cathode of diode DA1 would be connected to a node of a primary commutation switch pair. The cathode of diode DA2 would still be connected to the anode of diode DA1, and the switch element QA would be connected to motor PM. Commutation control switches SB or SC would be similarly end to end reversed.

Figure 5:
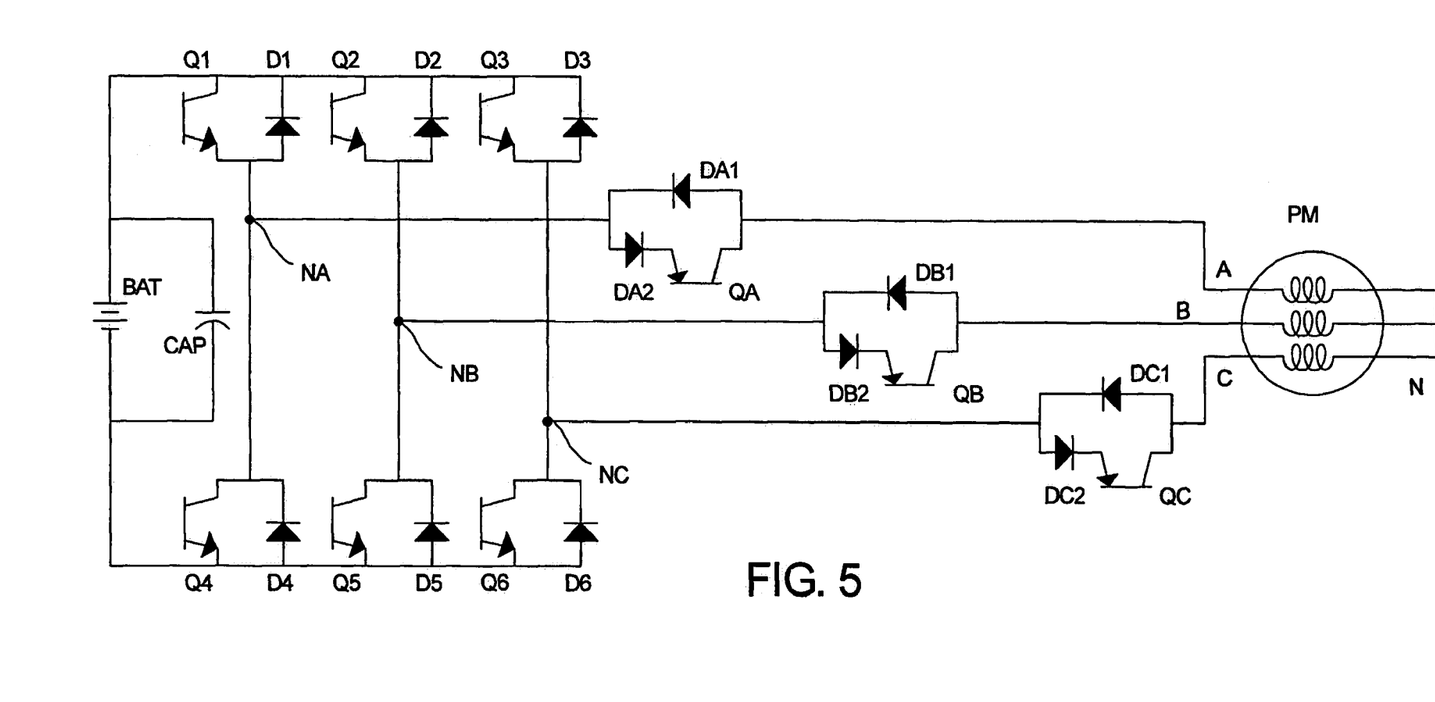
FIG. 5 is a schematic diagram of another variant of the inverter of FIG. 3.

Another variant of the circuit depicted in FIG. 3 is depicted in FIG. 5 where the switch element, QA, QB or QC, in each commutation control switch, SA, SB or SC, includes an PNP IGBT. FIG. 5 depicts diode DA1 of commutation control switch SA with its anode connected to motor PM and its cathode connected to a node of a primary commutation switch pair. The cathode of diode DA1 is connected to the anode of diode DA2, and the switch element QA is connected to motor PM. Commutation control switches SB or SC are similarly configured.

Alternatively, commutation control switches SA, SB and SC could be end to end reversed, and the switches would function fine, in a way similar to the way discussed with respect to FIG. 4.

Figure 6:
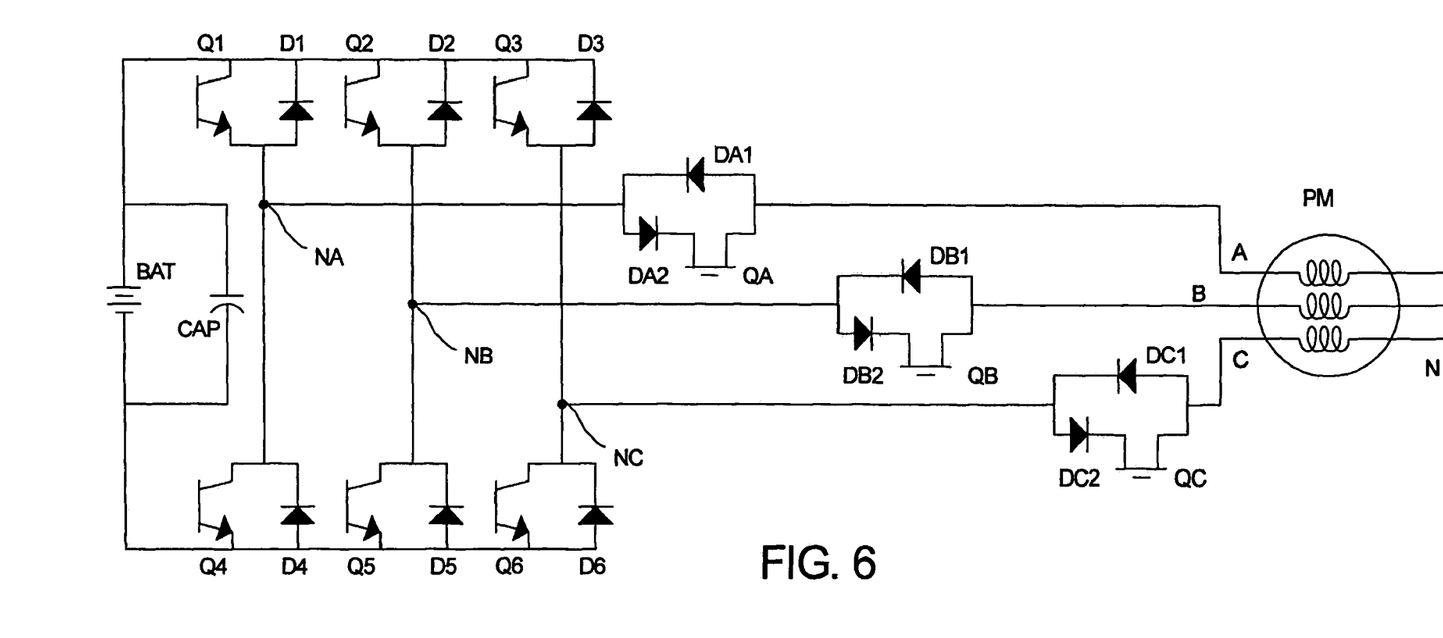
FIG. 6 is a schematic diagram of yet another variant of the inverter of FIG. 3.

Another variant of the circuit depicted in FIG. 3 is depicted in FIG. 6 where the switch element, QA, QB or QC, in each commutation control switch, SA, SB or SC, includes a MOSFET. FIG. 6 depicts diode DA1 of commutation control switch SA with its anode connected to motor PM and its cathode connected to a node of a primary commutation switch pair. The cathode of diode DA1 is connected to the anode of diode DA2, and the switch element QA is connected to motor PM. Commutation control switches SB or SC are similarly configured.

Alternatively, the positions of diode DA2 and switch element QA might be interchanged so that the cathode of diode DA2 is connected to the anode of diode DA1.

Alternatively, commutation control switches SA, SB and SC could be end to end reversed, and the switches would function fine, in a way similar to the way discussed with respect to FIG. 4.

In another embodiment of the invention, a motor vehicle engine includes a multi-phase machine PM having a stator with plural stator windings A, B, C, a controller, plural primary commutation switch pairs Q1–Q6 and D1–D6, a neutral terminal N and plural commutation control switches SA, SB and SC. The multi-phase machine may be a three-phase electric motor or may be any electric motor having more than three phase windings in the stator. Each of the plural primary commutation switch pairs includes first and second primary commutation switches connected at a respective node. The first switch pair includes a first primary commutation switch (Q1, D1) and a second primary commutation switch (Q4, D4) connected at node NA. The second switch pair includes a first primary commutation switch (Q2, D2) and a second primary commutation switch (Q5, D5) connected at node NB. The third switch pair includes a first primary commutation switch (Q3, D3) and a second primary commutation switch (Q6, D6) connected at node NC.

Each of the plural commutation control switches is coupled to a corresponding winding of the stator windings so that a corresponding stator winding circuit is formed between the neural terminal and a respective one of the nodes. Each of the plural stator winding circuits is coupled between the neural terminal N and a respective one of the nodes NA, NB or NC. Two alternative configuration are available to a designer for each stator winding circuit.

In the first alternative configuration, the first stator winding circuit includes commutation control switch SA connected between node NA and one end of winding A of the three-phase motor PM, and the other end of winding A is connected to the neutral terminal N. The second stator winding circuit includes commutation control switch SB connected between node NB and one end of winding B of the three-phase motor PM, and the other end of winding B is connected to the neutral terminal N. The third stator winding circuit includes commutation control switch SC connected between node NC and one end of winding C of the three-phase motor PM, and the other end of winding C is connected to the neutral terminal N.

In the second alternative configuration, the first stator winding circuit includes commutation control switch SA connected between the neutral terminal N and one end of winding A of the three-phase motor PM, and the other end of winding A is connected to node NA. The second stator winding circuit includes commutation control switch SA connected between the neutral terminal N and one end of winding B of the three-phase motor PM, and the other end of winding B is connected to node NB. The third stator winding circuit includes commutation control switch SC connected between the neutral terminal N and one end of winding C of the three-phase motor PM, and the other end of winding C is connected to node NC. A designer may even choose to connect one or more of the commutation control switches between the motor PM and the neutral terminal N, and choose to connect other commutation control switches between the motor PM and respective ones of the nodes.

As discussed above with respect to FIG. 3, each commutation control switch includes a first diode connected in parallel with a series switch circuit, and each series switch circuit includes a second diode and a switch element. The switch element is connected in series with the second diode. Also as discussed above with respect to FIG. 3, the controller is coupled to the switch element in each of the commutation control switches and to the primary commutation switch pairs to control an on time and an off time of the primary commutation switches relative to a point where a supply voltage is equal to the back emf.

In yet another embodiment according to the invention, an electric motor system includes an electric power source, multi-phase machine PM having a stator with plural stator windings A, B, C, a controller, plural primary commutation switch pairs Q1–Q6 and D1–D6 coupled to the electric power source, a neutral terminal N and plural commutation control switches SA, SB and SC coupled to the multi-phase machine. The multi-phase machine may be a three-phase electric motor or may be any electric motor having more than three phase windings in the stator. The electric power source may be an electric battery BAT, a fuel cell or the like. Preferably, a capacitor CAP is connected in parallel with the electric power source. Each of the plural primary commutation switch pairs includes first and second primary commutation switches connected at a respective node. The first switch pair includes a first primary commutation switch (Q1, D1) and a second primary commutation switch (Q4, D4) connected at node NA. The second switch pair includes a first primary commutation switch (Q2, D2) and a second primary commutation switch (Q5, D5) connected at node NB. The third switch pair includes a first primary commutation switch (Q3, D3) and a second primary commutation switch (Q6, D6) connected at node NC.

As discussed above with respect to FIG. 3, each of the plural commutation control switches is coupled to a corresponding winding of the stator windings so that a corresponding stator winding circuit is formed between the neural terminal and a respective one of the nodes. Each of the plural stator winding circuits is coupled between the neural terminal N and a respective one of the nodes NA, NB or NC. Two alternative configuration are available to a designer for each stator winding circuit as discussed above with respect to FIG. 3.

As discussed above with respect to FIG. 3, each commutation control switch includes a first diode connected in parallel with a series switch circuit, and each series switch circuit includes a second diode and a switch element. The switch element is connected in series with the second diode. Also as discussed above with respect to FIG. 3, the controller is coupled to the switch element in each of the commutation control switches and to the primary commutation switch pairs to control an on time and an off time of the primary commutation switches relative to a point where a supply voltage is equal to the back emf.

Having described preferred embodiments of a novel circuit for controlling a multi-phase machine (which are intended to be illustrative and not limiting), it is noted that modifications and variations can be made by persons skilled in the art in light of the above teachings. It is therefore to be understood that changes may be made in the particular embodiments of the invention disclosed which are within the scope of the invention as defined by the appended claims.

Having thus described the invention with the details and particularity required by the patent laws, what is claimed and desired protected by Letters Patent is set forth in the appended claims.

What is claimed is:

1. A circuit for controlling a multi-phase machine having a stator with plural stator windings, the circuit comprising:
   a controller;
   a plurality of primary commutation switch pairs, each switch pair including first and second primary commutation switches connected at a respective node;
   a neutral terminal; and
   a plurality of commutation control switches, each commutation control switch being coupled to a corresponding winding of the stator windings so that a corresponding stator winding circuit is formed between the neural terminal and a respective one of the nodes,
       wherein each commutation control switch includes a first diode connected in parallel with a series switch circuit,
       wherein each series switch circuit includes a second diode and a switch element, the switch element being connected in series with the second diode, and
       wherein the controller is coupled to the switch element in each of the commutation control switches and to the primary commutation switch pairs to control an on time and an off time of the primary commutation switches relative to a point where a supply voltage is equal to the back emf.

2. A circuit according to claim 1, wherein the switch element in each commutation control switch includes one of an NPN IGBT, a PNP IGBT and a MOSFET.

3. A circuit according to claim 2, wherein an anode of one of the first and second diodes is connected to a cathode of another of the first and second diodes in each of the commutation control switches.

4. A circuit according to claim 1, wherein an anode of one of the first and second diodes is connected to a cathode of another of the first and second diodes in each of the commutation control switches.

5. A motor vehicle engine comprising:
   a multi-phase machine having a stator with plural stator windings;
   a controller;
   a plurality of primary commutation switch pairs, each switch pair including first and second primary commutation switches connected at a respective node;
   a neutral terminal; and
   a plurality of commutation control switches coupled to the multi-phase machine, each commutation control switch being coupled to a corresponding winding of the stator windings so that a corresponding stator winding circuit is formed between the neural terminal and a respective one of the nodes,
       wherein each commutation control switch includes a first diode connected in parallel with a series switch circuit,
       wherein each series switch circuit includes a second diode and a switch element, the switch element being connected in series with the second diode, and
       wherein the controller is coupled to the switch element in each of the commutation control switches and to the primary commutation switch pairs to control an on time and an off time of the primary commutation switches relative to a point where a supply voltage is equal to the back emf.

6. A motor vehicle engine according to claim 5, wherein the switch element in each commutation control switch includes one of an NPN IGBT, a PNP IGBT and a MOSFET.

7. A motor vehicle engine according to claim 6, wherein an anode of one of the first and second diodes is connected to a cathode of another of the first and second diodes in each of the commutation control switches.

8. A motor vehicle engine according to claim 5, wherein an anode of one of the first and second diodes is connected to a cathode of another of the first and second diodes in each of the commutation control switches.

9. An electric motor system comprising:

an electric power source;

a multi-phase machine having a stator with plural stator windings;

a controller;

a plurality of primary commutation switch pairs coupled to the electric power source, each switch pair including first and second primary commutation switches connected at a respective node;

a neutral terminal; and a plurality of commutation control switches coupled to the multi phase machine, each commutation control switch being coupled to a corresponding winding of the stator windings so that a corresponding stator winding circuit is formed between the neural terminal and a respective one of the nodes, wherein each commutation control switch includes a first diode connected in parallel with a series switch circuit, wherein each series switch circuit includes a second diode and a switch element, the switch element being connected in series with the second diode, and wherein the controller is coupled to the switch element in each of the commutation control switches and to the primary commutation switch pairs to control an on time and an off time of the primary commutation switches relative to a point where a supply voltage is equal to the back emf.

10. A system according to claim 9, wherein the switch element in each commutation control switch includes one of an NPN IGBT, a PNP IGBT and a MOSFET.

11. A system according to claim 10, wherein an anode of one of the first and second diodes is connected to a cathode of another of the first and second diodes in each of the commutation control switches.

12. A system according to claim 9, wherein an anode of one of the first and second diodes is connected to a cathode of another of the first and second diodes in each of the commutation control switches.

* * * * *